United States Patent
Platvoet et al.

(10) Patent No.: US 6,663,839 B2
(45) Date of Patent: Dec. 16, 2003

(54) RADIAL FLOW GAS PHASE REACTOR AND METHOD FOR REDUCING THE NITROGEN OXIDE CONTENT OF A GAS

(75) Inventors: Erwin M. J. Platvoet, Jersey City, NJ (US); Steven M. Hopkins, Jersey City, NJ (US)

(73) Assignee: ABB Lummus Global Inc., Bloomfield, NJ (US)

( * ) Notice: Subject to any disclaimer, the term of this patent is extended or adjusted under 35 U.S.C. 154(b) by 60 days.

(21) Appl. No.: 09/793,471

(22) Filed: Feb. 26, 2001

(65) Prior Publication Data

US 2002/0150526 A1 Oct. 17, 2002

(51) Int. Cl.$^7$ ............... B01D 53/74; B01J 35/04
(52) U.S. Cl. ............... 422/177; 422/172; 422/173; 422/176; 422/180; 422/181
(58) Field of Search ............... 422/168–173, 422/177, 180, 176, 181, 218; 110/345

(56) References Cited

U.S. PATENT DOCUMENTS

| | | | |
|---|---|---|---|
| 2,472,254 A | 6/1949 | Johnson | 422/193 |
| 3,041,149 A | 7/1962 | Houdry | 422/173 |
| 3,380,810 A * | 4/1968 | Hamblin | 422/176 |
| 3,594,131 A | 7/1971 | De Palma et al. | 422/218 |
| 3,730,691 A * | 5/1973 | Lang et al. | 422/171 |
| 3,733,181 A * | 5/1973 | Tourtellotte et al. | 422/171 |
| 3,887,683 A | 6/1975 | Abe et al. | 423/239 |
| 4,160,009 A | 7/1979 | Hamabe | 422/173 |
| 4,160,805 A | 7/1979 | Inaba et al. | 422/180 |
| 4,199,554 A | 4/1980 | Araki et al. | 423/239.1 |
| 4,246,234 A | 1/1981 | Kittrell et al. | 422/171 |
| 4,283,368 A | 8/1981 | Harada et al. | 422/181 |
| 4,302,431 A | 11/1981 | Atsukawa et al. | 422/171 |
| 4,405,562 A | 9/1983 | Zardi et al. | 422/148 |
| 4,457,895 A * | 7/1984 | Prigent | 422/179 |
| 4,478,793 A | 10/1984 | Vickers | 422/216 |
| 4,576,799 A | 3/1986 | Wörner et al. | 422/176 |
| 4,602,673 A | 7/1986 | Michelfelder et al. | 422/173 |
| 4,678,643 A | 7/1987 | Fetzer | 422/175 |
| 4,682,470 A | 7/1987 | Shaff | 60/299 |
| 4,725,416 A | 2/1988 | Kristof et al. | 423/239.1 |
| 4,726,935 A | 2/1988 | Inatsune et al. | 422/171 |
| 4,732,743 A | 3/1988 | Schmidt et al. | 423/239.1 |
| 4,739,826 A | 4/1988 | Michelfelder et al. | 422/201 |
| 4,820,492 A | 4/1989 | Wada et al. | 422/111 |
| 4,828,806 A | 5/1989 | Flockenhaus et al. | 423/213.5 |
| 4,830,833 A | 5/1989 | Shaff | 422/181 |
| 4,867,953 A | 9/1989 | Riekert et al. | 423/239.1 |
| 4,880,378 A | 11/1989 | Hums | 422/180 |
| 4,903,755 A | 2/1990 | Michelfelder et al. | 422/200 |
| 4,916,107 A | 4/1990 | Brand et al. | 502/309 |
| 4,950,473 A | 8/1990 | Flockenhaus et al. | 423/235 |
| 4,961,917 A | 10/1990 | Byrne | 423/239.1 |
| 5,047,220 A | 9/1991 | Polcer | 423/239.1 |
| 5,078,973 A | 1/1992 | Kuroda et al. | 422/171 |
| 5,104,629 A | 4/1992 | Dreschler | 423/239.1 |
| 5,108,717 A | 4/1992 | Deller et al. | 422/171 |
| 5,139,757 A | 8/1992 | Topsoe | 423/239.1 |
| 5,145,652 A | 9/1992 | Veser et al. | 422/171 |
| 5,149,884 A | 9/1992 | Brenner et al. | 568/471 |

(List continued on next page.)

FOREIGN PATENT DOCUMENTS

| | | |
|---|---|---|
| DE | 197 20 205 A1 | 11/1998 |
| WO | WO 98/03249 | 1/1998 |
| WO | WO 00/53904 | 9/2000 |

Primary Examiner—Hien Tran
(74) Attorney, Agent, or Firm—Dilworth & Barrese, LLP

(57) ABSTRACT

A radial flow gas phase reactor for the selective catalytic reduction of nitrogen oxide in a gas stream includes a shell enclosing an interior space in which is located at least one catalyst bed containing a catalyst for the selective conversion of $NO_x$. A deflector directs the flow of gas radially through the bed. An injector upstream of the catalyst introduces a reducing agent such as ammonia into the inlet gas stream. The catalyst bed can include particulate, monolith, or microengineered catalyst.

15 Claims, 11 Drawing Sheets

U.S. PATENT DOCUMENTS

| | | | |
|---|---|---|---|
| 5,155,083 A | 10/1992 | Yoshida et al. | 502/242 |
| 5,233,934 A * | 8/1993 | Krigmont et al. | 110/345 |
| 5,318,755 A | 6/1994 | Kuivalainen et al. | 422/171 |
| 5,358,698 A | 10/1994 | Butler et al. | 422/218 |
| 5,380,499 A | 1/1995 | MacInnis | 422/173 |
| 5,401,479 A | 3/1995 | Matros et al. | 423/239.1 |
| 5,437,851 A | 8/1995 | MacInnis | 423/239.1 |
| 5,466,421 A | 11/1995 | Deller et al. | 422/171 |
| 5,474,751 A | 12/1995 | Sigling et al. | 423/239.1 |
| 5,531,968 A | 7/1996 | Steenackers | 422/176 |
| 5,567,392 A | 10/1996 | Becker et al. | 422/174 |
| 5,575,980 A | 11/1996 | Turek | 422/181 |
| 5,593,645 A | 1/1997 | Steenackers et al. | 422/181 |
| 5,603,909 A | 2/1997 | Varner et al. | 423/239.1 |
| 5,645,803 A | 7/1997 | Steenackers et al. | 422/177 |
| 5,678,625 A | 10/1997 | Schlüter et al. | 422/173 |
| 5,694,869 A | 12/1997 | Breen et al. | 110/345 |
| 5,728,356 A | 3/1998 | Iida et al. | 423/239.1 |
| 5,738,024 A | 4/1998 | Winegar | 110/345 |
| 5,756,059 A | 5/1998 | Zamansky et al. | 423/239.1 |
| 5,809,776 A | 9/1998 | Holtermann et al. | 422/181 |
| 5,814,284 A | 9/1998 | Schlüter | 422/175 |
| 5,817,282 A | 10/1998 | Radlein et al. | 423/235 |
| 5,820,838 A | 10/1998 | Tsuo et al. | 423/235 |
| 5,827,485 A | 10/1998 | Labal et al. | 422/179 |
| 5,918,555 A | 7/1999 | Winegar | 422/172 |
| 5,985,222 A | 11/1999 | Sudduth et al. | 423/235 |
| 5,988,115 A | 11/1999 | Anderson et al. | 422/171 |
| 6,019,068 A | 2/2000 | Tsuo et al. | 122/4 D |
| 6,048,510 A | 4/2000 | Zauderer | 423/235 |
| 6,066,303 A | 5/2000 | Sudduth et al. | 423/235 |
| 6,080,376 A | 6/2000 | Iida et al. | 423/239.1 |

* cited by examiner a = Corrugation height
b = Pitch length

RADIAL FLOW GAS PHASE REACTOR AND METHOD FOR REDUCING THE NITROGEN OXIDE CONTENT OF A GAS

BACKGROUND OF THE INVENTION

1. Field of the Invention

The invention herein relates to a chemical reactor and method for catalytically reducing the content of nitrogen oxide in a gas, particularly flue or stack gas, resulting from the combustion of fuel.

2. Description of the Related Art

The combustion of fuels in various industrial processes often generates undesirable SO oxides of nitrogen ($NO_x$) usually in the form of nitric oxide (NO) and nitrogen dioxide ($NO_2$). High combustion temperatures tend to produce more $NO_x$. Because $NO_x$ is harmful to the environment, efforts have been made to reduce the emission of $NO_x$ in gases produced by industrial processes involving the combustion of fuel, particularly gases resulting from the operation of power plants, thermal cracking furnaces, incinerators, internal combustion engines, metallurgical plants, fertilizer plants and chemical plants.

Methods for selectively reducing the $NO_x$ content of a flue gas are known. Generally, such methods involve the reaction of $NO_x$ with a reducing agent, optionally in the presence of a catalyst. The selective non-catalytic reduction ("SNCR") of $NO_x$ with a reducing agent such as ammonia or urea requires a relatively high temperature, e.g., in the range of from about 1600° F. to about 2100° F.

Alternatively, the reduction of $NO_x$ with ammonia can be performed catalytically at a much lower temperature, e.g. from about 500° F. to about 950° F., in a process known as selective catalytic reduction ("SCR").

One problem associated with the treatment of flue gas using conventional SCR methods and apparatus is that the weight and bulk of the equipment necessary to achieve satisfactory removal of $NO_x$ requires that it be located at ground level. Many industrial plants need to be retrofitted with NO, removal ("deNOx") equipment in order to meet the requirements of more stringent government regulations. However, because of the physical bulk of the deNOx system, the flue gas must be diverted to ground level for treatment and then sent back into a stack for subsequent exhaust to the atmosphere. To avoid the large cost of such a system it would be highly advantageous to provide a relatively lightweight deNOx unit which can be incorporated directly into the stack.

SUMMARY OF THE INVENTION

In accordance with the present invention, a radial flow gas phase reactor is provided for the chemical conversion of nitrogen oxide in a gas stream and comprises:

a) a shell having interior and exterior surfaces, a gas stream inlet for receiving an inlet gas stream having an initial concentration of nitrogen oxide and a gas stream outlet through which treated gas of reduced nitrogen oxide concentration relative to the nitrogen oxide concentration of the inlet gas stream is discharged;

b) at least one injector for introducing reducing agent into the inlet gas stream;

c) at least one catalyst bed within the shell positioned therein at a location which is approximately at, or downstream of, the injector, the catalyst bed containing at least one nitrogen oxide conversion catalyst for the selective catalytic reduction of nitrogen oxide in the inlet gas stream to produce a treated gas of reduced nitrogen oxide concentration, the catalyst bed having an interior wall defining an axial passageway and an outer wall spaced apart from the interior surface of the reactor shell; and, d) an inlet gas stream deflector for directing the flow of inlet gas containing reducing agent radially through the catalyst bed, the treated gas emerging from its radial passage through the catalyst bed and exiting from the reactor shell through the gas stream outlet.

The radial flow reactor of this invention provides a relatively lightweight unit for the selective catalytic reduction of $NO_x$ in a gas, in particular flue gas produced by the combustion of a fossil fuel in a furnace, and is readily incorporated into furnaces equipped with stacks of conventional design, thus lending itself well to retrofit installation in existing units.

BRIEF DESCRIPTION OF THE DRAWINGS

Various embodiments of the radial flow reactor of this invention and preferred catalyst arrangements employed therein are described below with reference to the drawings wherein.

DETAILED DESCRIPTION OF PREFERRED EMBODIMENTS

As used herein the terms "stack" and "flue" are used synonymously. All quantities should be understood as being modified by the term "about" or "approximately". Composition percentages are by weight unless specified otherwise.

The term "radial flow" as herein used in association with the flow of gas through a catalyst bed contemplates outward flow from the inside of the bed to the outside as well as inward flow from the outside of the bed to the inside of the bed, the bed having substantially an annular shape defined by inner and outer cylindrical walls, or a shape effectively functioning in a manner of an annulus, for example with inner and or outer walls having polygonal shapes such as hexagonal, octagonal, etc. as seen in cross section.

The term "nitrogen oxide" as used herein refers to any oxide of nitrogen, such as NO, $NO_2$, $N_2O_4$, $N_2O$ and any of their mixtures, and is alternatively designated "$NO_x$".

The reactor and method for the selective catalytic reduction of $NO_x$ of this invention preferably employ ammonia as the reducing agent. NOx reacts with ammonia in the presence of catalyst to produce nitrogen and water as shown in the following equation (not stoichiometrically balanced):

$$NO_x + NH_3 \rightarrow N_2 + H_2O$$

The reactor and deNOx method described herein can be used in any application requiring the treatment of a $NO_x$ containing gas to reduce its $NO_x$ level. Typical combustion equipment producing high levels of $NO_x$ include power plants, fluid catalytic cracking (FCC) regenerators, glass furnaces, thermal crackers, and the like. The deNOx method herein will be particularly described in conjunction with a thermal cracking unit for producing olefins (e.g., ethylene, propylene, butylene, etc.) from a saturated hydrocarbon feedstock such as ethane, propane, naphtha, and the like. However, the reactor and method can be used with any combustion equipment or process which generates a gas containing undesirable levels of $NO_x$.

Figure 1B:
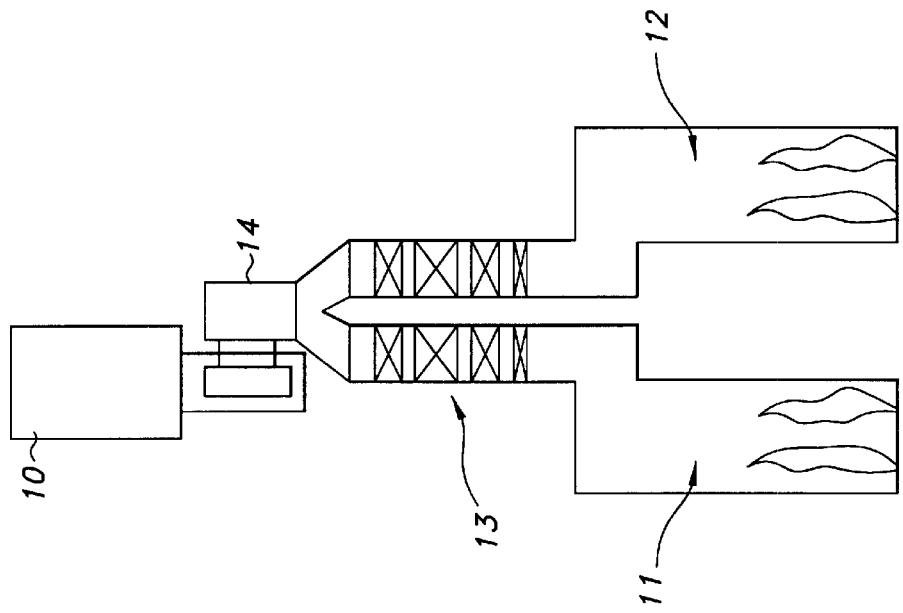
FIG. 1B is a side view of FIG. 1A.
Figure 1A:
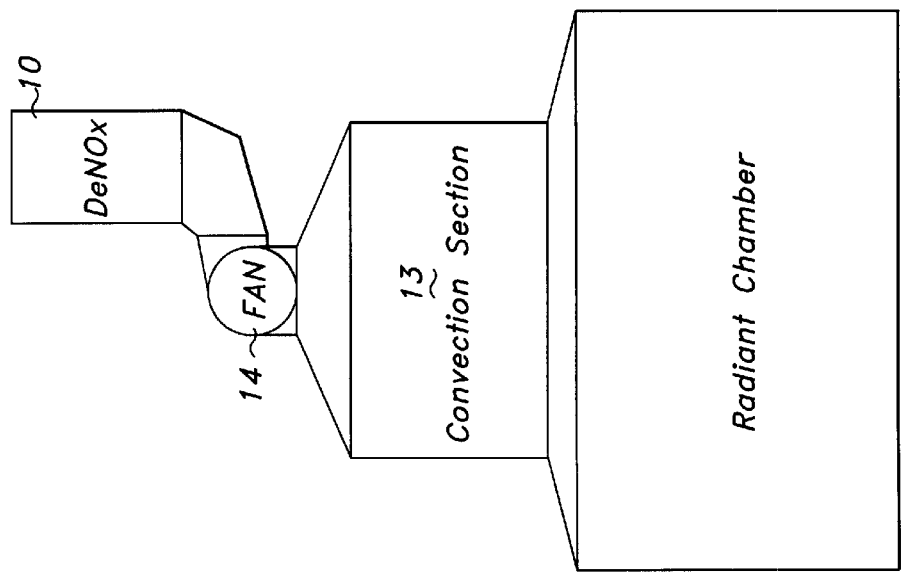
FIG. 1A is a diagrammatic view of a furnace system of a known type incorporating the radial flow reactor of the present invention in its stack section.

Referring now to FIGS. 1A and 1B, radial flow gas phase deNOx reactor 10 is illustrated in conjunction with a thermal cracking system employing twin furnaces 11 and 12 having a radiant combustion chamber operating at about 2200° F. for the cracking of the feedstock. Each furnace produces a flue gas which exits therefrom through respective stacks. Typically, the flow rate of flue gas in each stack ranges from about 100,000–300,000 lbs/hr. The flue gas typically contains the following components:

| | |
|---|---|
| Nitrogen | 60–80 vol % |
| Oxygen | 1–4 vol % |
| Water vapor | 10–25 vol % |
| Carbon dioxide | 2–20 vol % |
| Nitrogen oxide | 50–300 ppm. |

The flue gases exiting the radiant chamber are typically at a temperature of about 1800° F. Each stack optionally includes a convection section 13 which includes heat exchange equipment through which the flue gas is passed for heat recovery. The flue gas typically exits the convection section at a temperature of from about 300° F.–500° F., although the heat recovery process can be adjusted to provide flue gas temperatures outside this range. The flue gases of the separate stacks are then joined and moved by fan 14 into deNOx system 10. Fan 14 increases the pressure of the flue gas for moving the gas through the deNOx system 10.

The radial flow reactor of the present invention advantageously provides a relatively long gas flow length prior to the gas entering the catalyst bed. Especially in conjunction with a deflector, the long gas flow length helps provide a more even velocity distribution of gas flow through the bed. This is significant because the gas flow exhibits severe velocity distribution at the fan outlet. In conventional systems, the catalyst beds are overdesigned by about 20% or more to compensate for the velocity maldistribution caused by the fan. The overdesign results in excessively large and heavy catalyst beds which are avoided by the radial reactor system described herein.

Figure 2A:
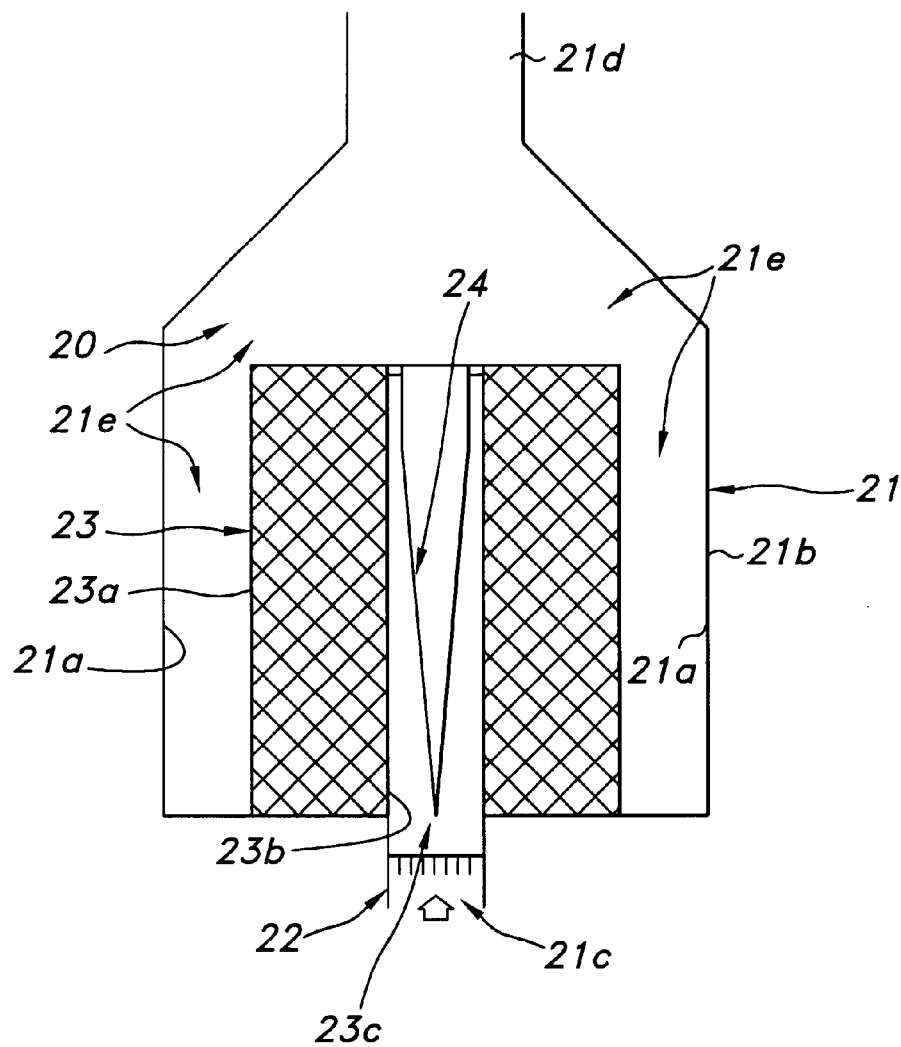
FIG. 2A is a diagrammatic view of a radial flow reactor featuring a single catalyst bed.

Referring now to FIG. 2A, in one embodiment, radial flow gas phase reactor 20 includes a reactor shell 21 having an interior surface 21a and exterior surface 21b. Shell 21 includes a gas stream inlet 21c through which inlet gas containing an initial concentration of $NO_x$ is received, a gas stream outlet 21d through which treated gas containing a reduced concentration of $NO_x$ is discharged, and a passageway 21e communicating with gas stream outlet 21d providing for the passage of treated gas thereto.

Injector 22 can be any type of injector known in the art for introducing a reducing agent. Typically, such injectors include a grid-like portion positioned in the inlet gas stream upstream of the catalyst bed. The grid-like portion includes a collection of sparger tubes with injection nozzles arranged in an evenly distributed manner. Generally, the reducing agent is injected in a direction opposite that of the flow of inlet gas. The reducing agent is preferably ammonia but may alternatively be, or additionally include, urea, an alkyl amine or other suitable reducing agent. Injector 22 can be positioned within the inlet 21c or upstream of the inlet 21c.

Catalyst bed 23 contains at least one catalyst for the selective reduction of nitrogen oxide. The preferred temperature for the selective catalytic reduction reaction will typically range from about 380° F. to about 550° F., more preferably from about 400° F. to 450° F. Generally, the lower the temperature, the greater amount of catalyst is required to achieve a predetermined level of $NO_x$ conversion. In cases where the flue gas temperature is undesirably low, a burner or other source of heat can be used to increase the flue gas temperature. Alternatively, convection section 13 of the furnace system can be configured to provide a flue gas having a temperature suitable for selective catalytic reduction of $NO_x$.

Catalysts for the selective reduction of nitrogen oxides in the presence of reducing agent are known in the art. Representative examples of such catalysts include, but are not limited to, oxides of vanadium, aluminum, titanium, tungsten and molybdenum. Zeolites can also be used. Examples of the latter include ZSM-5 modified with protons, or with copper, cobalt, silver, zinc, or platinum cations or their combinations. It is to be understood, however, that the scope of the present invention is not limited to a specific SCR catalyst or catalyst composition.

Catalyst bed 23 possesses an interior wall 23b defining an axial passageway 23c for receiving the inlet gas stream containing the reducing agent. As shown, axial passageway 23c is in the form of a bore of substantially uniform diameter throughout its length. However, other axial passageway configurations are possible. For example, as illustrated in FIG. 2C, reactor 50 includes a conical or frustoconical shaped catalyst bed 53 having a conical passageway 53c. Inlet gas stream enters the inlet 51c and passes injector 52 whereupon it enters passageway and is deflected by deflector 54 into passing radially outward through catalyst bed 53. Upon emerging from catalyst bed 53, treated gas flows to outlet 51d. Referring again to FIG. 2A, the treated gas containing a reduced concentration of $NO_x$ emerges from the outer wall 23a of the catalyst bed into passageway 23e where it flows to outlet 21d. Passageway 21e is at least partially defined by the annular space between outer wall 23a of the catalyst bed and inner surface 21a of the reactor shell.

Catalyst bed 23 is generally annularly shaped and preferably the outer and interior walls 23a and 23b are concentric cylinders. Alternatively, the outer and inner walls 23a and 23b can be polygonal such as octagonal, hexagonal, etc., as shown for example in FIG. 2D as catalyst bed 23'. Polygonal shaped catalyst beds are especially suitable for use with MEC catalysts (described below).

An inlet gas stream deflector 24 fabricated from a gas-impervious material such as sheet metal is positioned within axial passageway 23c for directing the flow of inlet gas stream entering passageway 23c radially outward through catalyst bed 23. In one preferred embodiment, deflector 24 is conical in shape with an apex pointing upstream so as to evenly distribute the gas flow. In yet another preferred embodiment of the invention as shown in FIG. 2E, deflector 24' is positioned in axial passageway 23c of bed 23 and possesses an arcuate, preferably parabolic, surface 24"and an upstream pointing apex 24'". Parabolically shaped deflector 24'has the hydrodynamic advantage of providing a more even radial gas flow through bed 23 compared to, say, a conically shaped deflector.

Figure 2B:
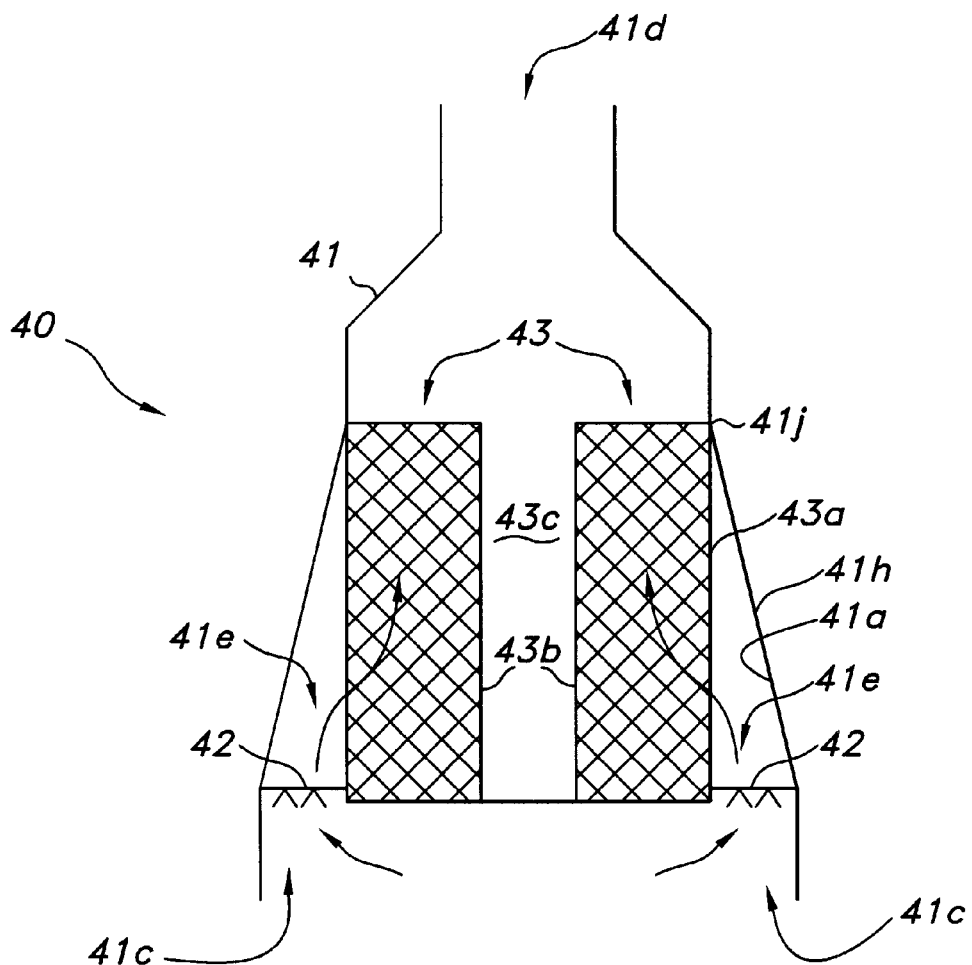
FIG. 2B is a diagrammatic view of an alternative embodiment of the single bed radial flow reactor.
Figure 2C:
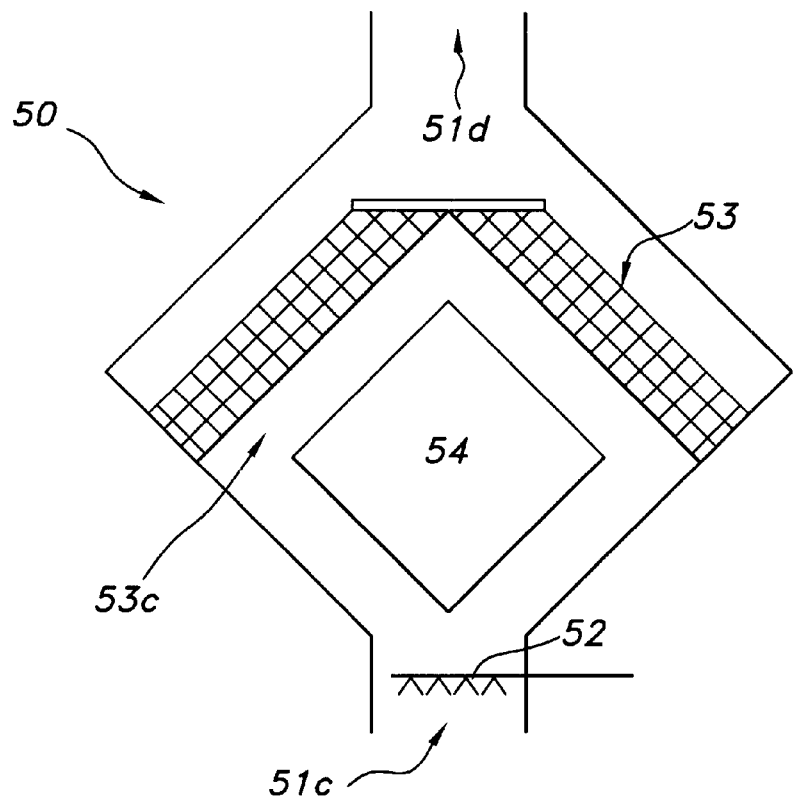
FIG. 2C is a diagrammatic view of yet another alternative embodiment of the single bed radial flow reactor.
Figure 2D:
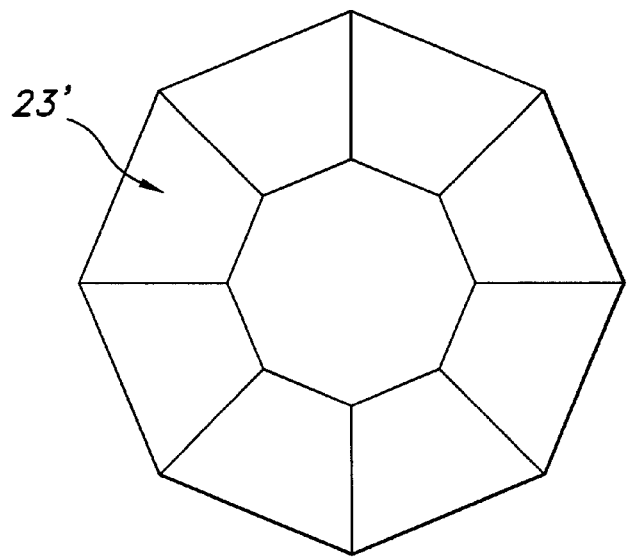
FIG. 2D is a plan view of a polygonal catalyst bed.
Figure 2E:
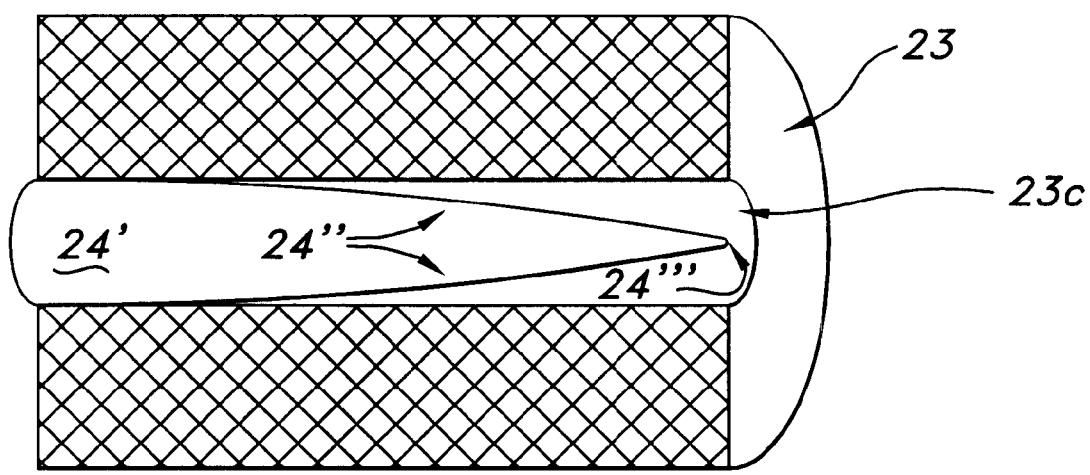
FIG. 2E is a diagrammatic view of a parabolic deflector positioned at the axial bore of a catalyst bed.

Referring now to FIG. 2B, in another embodiment, reactor 40 includes a shell 41 having flared side portions 41h. Inlet gas stream passes one or more injectors 42 at inlets 41c and flows into a passageway 41e defined by the space between outer wall 43a of catalyst bed 43 and interior surface 41a of the reactor shell 41. The interior surface 41a of the reactor shell and the outer wall 43a of the catalyst bed converge at region 41j so as to form a gas flow barrier at the downstream end of passageway 41e which deflects the inlet gas stream radially inward through the annular shaped catalyst bed 43. Treated gas emerges from the inner wall 43b of the catalyst bed into axial passageway 43c. The treated gas then flows to outlet 41d and exits the reactor.

Figure 3:
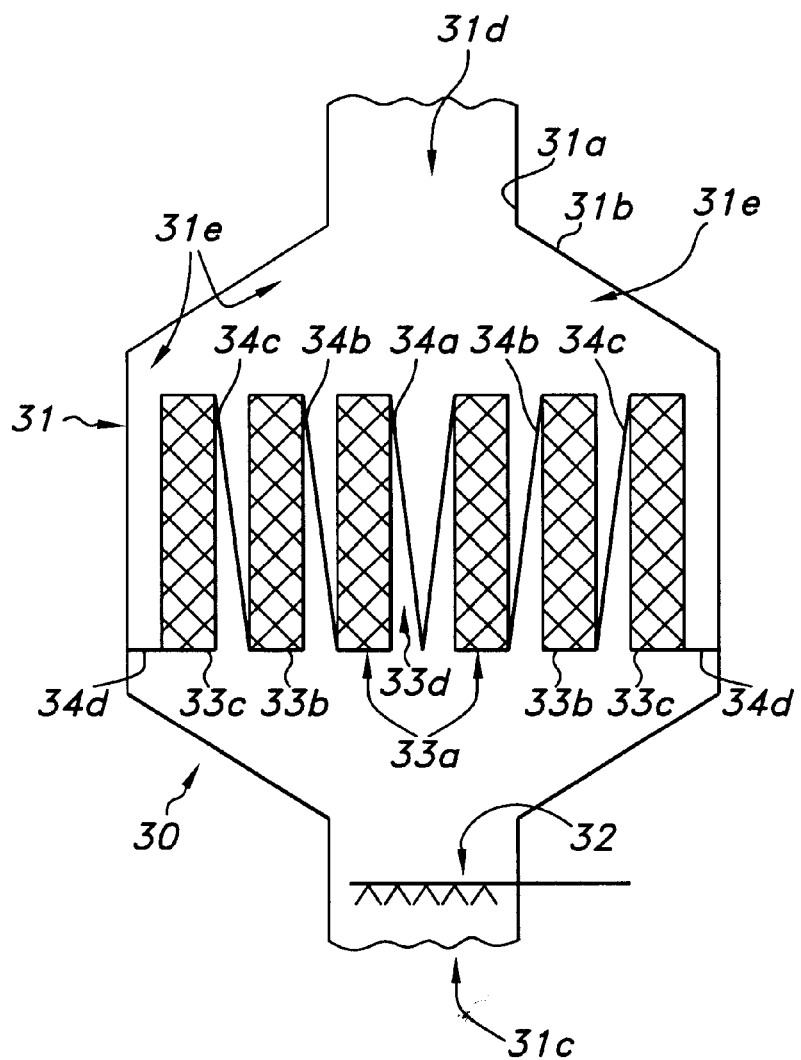
FIG. 3 is a diagrammatic view of a radial flow reactor featuring multiple concentric catalyst beds.

Referring now to FIG. 3, illustrating yet another radial reactor configuration, reactor 30 includes a reactor shell 31 enclosing an interior space. Shell 31 includes inner and outer surfaces 31a and 31b, respectively, an inlet 31c, outlet 31d, and a passageway 31e communicating with outlet 31d providing for the passage of treated gas thereto. Injector 32 can be positioned within inlet 31c or upstream of inlet 31c. The description given above with respect to injector 22 applies also to injector 32.

Reactor 30 includes at least two preferably concentric spaced-apart catalyst beds. As depicted in FIG. 3, reactor 30 includes concentric annular catalyst beds 33a, 33b, and 33c. Central catalyst bed 33a includes an axial bore 33d in which conical deflector 34a is positioned. Frustoconical deflector 34b is positioned within the annular space between catalyst bed 33a and 33b and frustoconical deflector 34c is similarly positioned within the annular space between catalyst beds 33b and 33c. Annular plate 34d prevents the inlet gas from by-passing the catalyst beds by entry into the annular space between catalyst bed 33c and the inner surface 31a of the shell. Inlet gas with reducing agent (e.g., ammonia) enters axial bore 33d and the bottom of the annular spaces between catalyst beds 33a and 33b, and 33b and 33c, and is diverted radially outward through respective catalyst beds by means of deflectors 34a, 34b, and 34c. The treated gas thereafter emerges from the beds into passageway 31e.

The catalyst can be in the form of particulate, monolith, or microengineered catalyst ("MEC").

Figure 4:
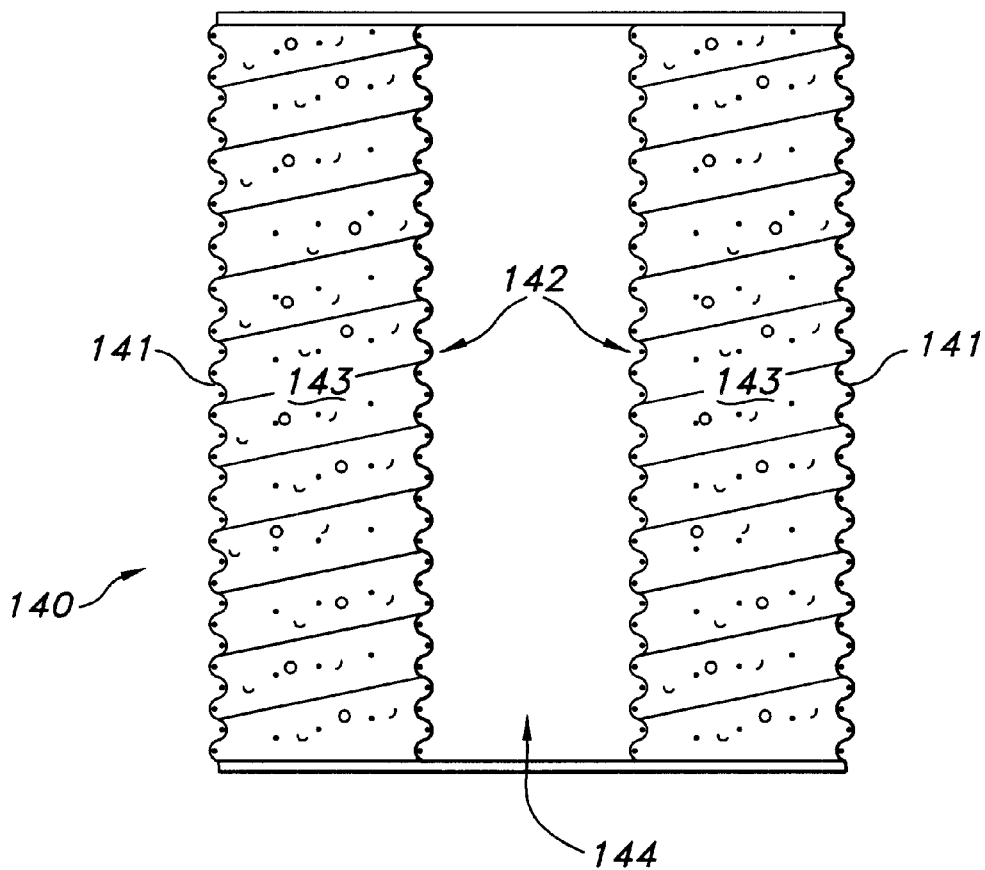
FIG. 4 is a sectional view of a catalyst bed employing particulate catalyst.

Referring to FIG. 4, catalyst bed 140 contains particulate catalyst 143 disposed within the annular space between outer screen 141 and inner screen 142. Inner screen 142 provides an inner wall structure defining an axial channel 144 for receiving inlet gas and reducing agent. The inner and outer screens 142 and 141 are commercially available from USF/Johnson Screens of Wytheville, Va. Suitable screens include, e.g., welded wire screens, looped wire screens and woven wire screens. The SCR catalyst can be in the form of particulate, or can be supported on a particulate catalyst support such as titania, zeolite, carbon, zirconia, ceramic or silica-alumina.

Figure 5:
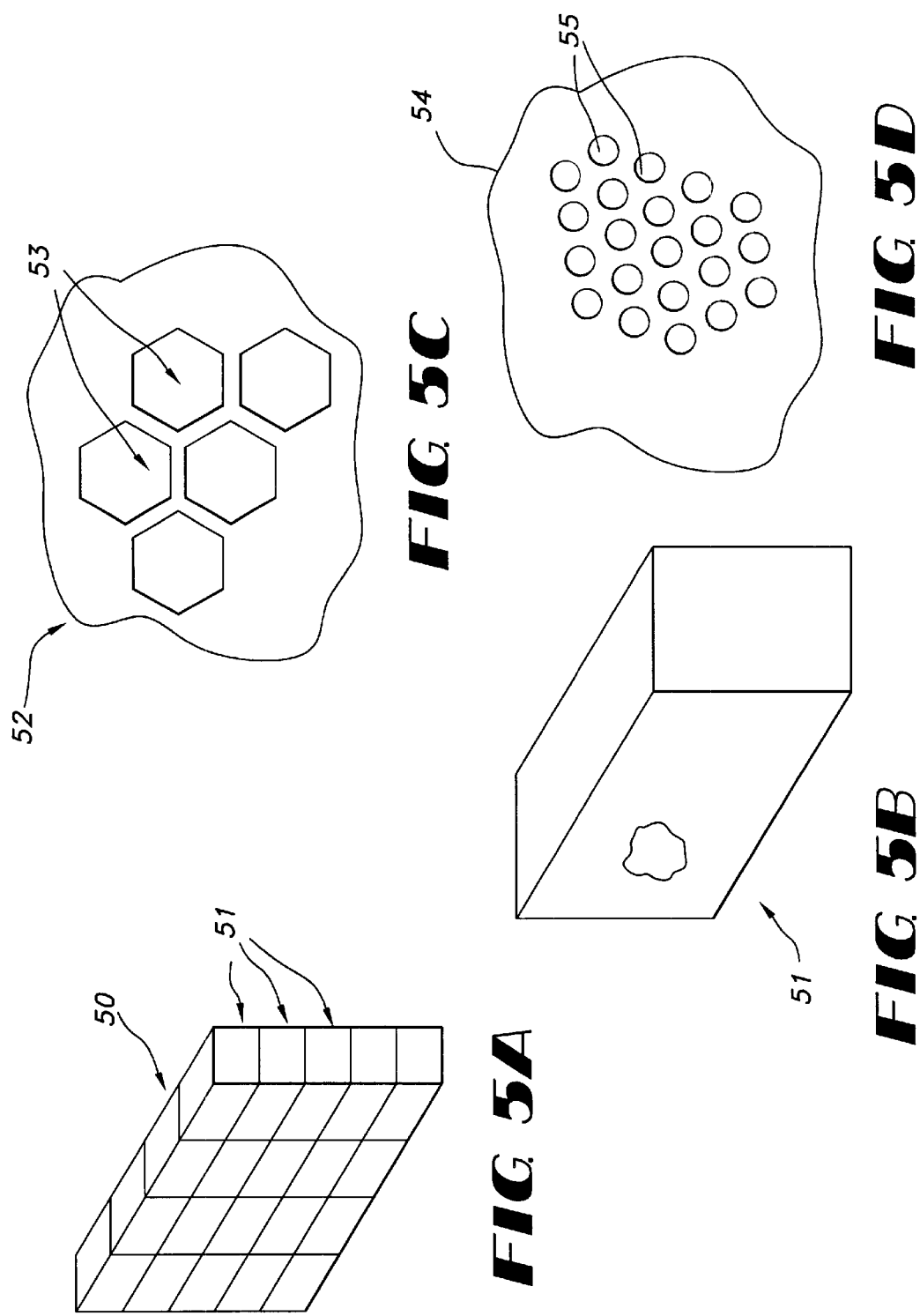
FIG. 5A illustrates a monolithic catalyst bed made up of brick-like units.
FIG. 5B is a perspective view of a brick-like unit making up the monolith catalyst bed of FIG. 5A.
FIGS. 5C and 5D illustrate alternative embodiments of monolith catalyst.

Referring now to FIGS. 5A–5D, the catalyst can be in the form of monolith 50 which can include a quantity of stacked brick-like units 51. The monolith catalyst 50 includes a plurality of parallel channels. As shown in FIG. 5c, monolith 52 possesses a honeycomb structure with hexagonal channels 53. The channels, however, can be of any suitable shape such as square, triangular, T-shapes, and the like. FIG. 5D illustrates a monolith 54 having circular channels 55. The monoliths can be formed by sintering or any other method known to those with skill in the art. Typically, the SCR catalyst is impregnated into the monolith support so as to coat the inner surface of the channels through which the gas stream flows for treatment.

In yet another alternative, the catalyst bed can include a microengineered catalyst ("MEC") wherein the SCR catalyst is supported on a mesh-like structure having a porosity greater than about 85%.

The MEC catalyst is described in copending U.S. patent application Serial No. 60/222,261 filed Jul. 31, 2000 entitled Conversion of Nitrogen Oxides in the Presence of a Catalyst Supported on a Mesh-Like Structure, the contents of which are incorporated by reference herein in their entirety.

The mesh-like material is comprised of fibers or wires, such as a wire or fiber mesh, a metal felt or gauze, metal fiber filter or the like. The mesh-like structure can be comprised of a single layer, or can include more than one layer of wires: e.g., a knitted wire structure or a woven wire structure, and preferably is comprised of a plurality of layers of wires or fibers to form a three-dimensional network of materials. In a preferred embodiment, the support structure is comprised of a plurality of layers of fibers that are oriented randomly in the layers. One or more metals can be used in producing a metal mesh. Alternatively, the mesh fibers can include materials in addition to metals.

In a preferred embodiment wherein the mesh-like structure is comprised of a plurality of layers of fibers to form the three-dimensional network of materials, the thickness of such support is at least five microns, and generally does not exceed ten millimeters. In accordance with a preferred embodiment, the thickness of the network is at least 50 microns and more preferably at least 100 microns and generally does not exceed 2 millimeters.

In general, the thickness or diameter of the fibers which form the plurality of layers of fibers is less than about 500 microns, preferably less than about 150 microns and more preferably less than about 30 microns. In a preferred embodiment, the thickness or diameter of the fibers is from about 8 to about 25 microns.

The three dimensional mesh-like structure can be produced by known methods such as any of those described in U.S. Pat. Nos. 5,304,330, 5,080,962; 5,102,745 or 5,096, 663, the contents of which are incorporated by reference in their entirety. It is to be understood, however, that such mesh-like structure can be formed by procedures other than those described in the aforementioned patents.

The mesh-like structure that is employed in the present invention (without supported catalyst on the mesh) has a porosity or void volume which is greater than 85%, and preferably is greater than 87% and more preferably is greater than 90%. The term "void volume" as used herein is determined by dividing the volume of the structure which is open by the total volume of the structure (openings and mesh material) and multiplying by 100.

In one embodiment, the catalyst is supported on the mesh-like material without the use of a particulate support.

In another embodiment, the catalyst for converting nitrogen oxide(s) is supported on a particulate support that is supported on the mesh-like material. The term "particulate" as used herein includes, and encompasses, spherical particles, elongated particles, fibers, etc. In general, the average particle size of the particulate on which catalyst may be supported does not exceed 200 microns and is typically no greater than 50 microns with the average particle size in the majority of cases not exceeding 20 microns. In general, the average particle size of such particulates is at least 0.002 micron and more generally at least 0.5 microns. When the catalyst supported on the particulate support is coated on the mesh, the average particle size of the catalyst support generally does not exceed 10 microns and, when entrapped in the mesh, generally does not exceed 150 microns.

In an embodiment of the invention, the mesh-like structure that functions as a support for the catalyst is in the form of a shaped structured packing. This packing can be configured as described below in embodiments given by example to provide for turbulence of the gas phase flowing over the catalyst in the reactor. The mesh-like catalyst support structure can be provided with suitable corrugations in order to provide for increased turbulence as described in more detail hereinafter. Alternatively, the mesh-like structure can include tabs or vortex generators to provide for turbulence, also as shown hereinafter. The presence of turbulence generators enhances mixing in the radial (and longitudinal) direction and also improves access to catalyst either coated on or entrapped in the mesh by providing local pressure differential across the mesh, and thus creating a driving force for flow. The structured packing can also be in the form of a module such as a roll of one or more sheets that is placed into the tubes of a reactor such that the channels in the module follow the longitudinal direction of the tube. The roll can comprise sheets that are flat, corrugated or wavy or a combination thereof and the sheets can contain fins or holes to promote mixing. The sheets can also be shaped into corrugated strips that are separated from each other by a flat sheet that exactly fit the size of the tube and are held together by welds, wires, a cylindrical flat sheet or combinations thereof.

It is to be understood that the mesh-like support that supports the catalyst may be employed in a form other than as a structured sheet. For example, the mesh-like support may be formed as rings, particles, ribbons, etc. and employed in a reactor as a packed bed.

The catalyst which is supported on the mesh-like structure can be present on the mesh-like support as a coating on the wires or fibers that form the mesh-like structure and/or can be present and retained in the interstices of the mesh-like structure.

The catalyst can be coated on the mesh-like structure by a variety of techniques, e.g., dipping or spraying. The catalyst particles can be applied to the mesh-like structure by contacting the mesh-like structure with a liquid coating composition (preferably in the form of a coating bath) that includes the particles dispersed in a liquid under conditions such that the coating composition enters or wicks into the mesh-like structure and forms a porous coating on both the interior and exterior portions of the mesh-like structure.

The catalyst is supported on the mesh-like structure in an amount effective to convert nitrogen oxide(s). In general, the catalyst is present in an amount of at least 5%, and preferably at least 10%, with the amount of catalyst generally not exceeding be 60% and more generally not exceeding 40%, all by weight, based on mesh and catalyst. In one embodiment where the porosity or void volume of the mesh-like structure prior to adding supported catalyst is greater than 87%, the weight percent of catalyst is from about 5% to about 40%, and when the porosity or void volume is greater than 90%, the weight percent of supported catalyst is from about 5% to about 80%.

Figure 6:
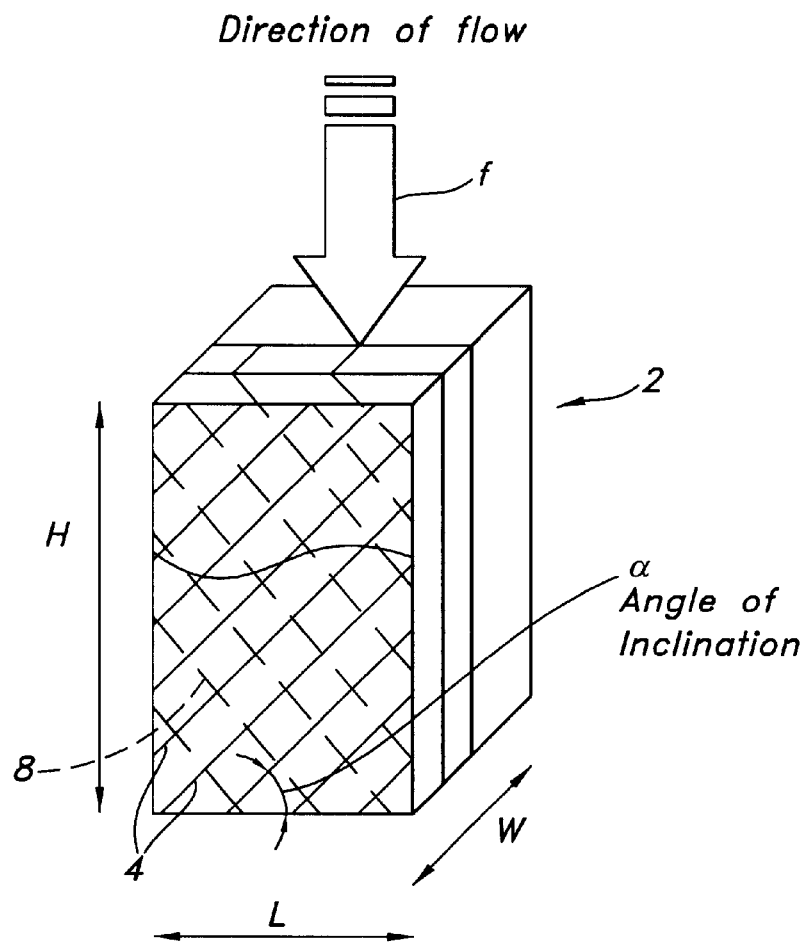
FIG. 6 is an isometric diagrammatic view of a packing structure useful for explaining the principles of the present invention.
Figure 6A:
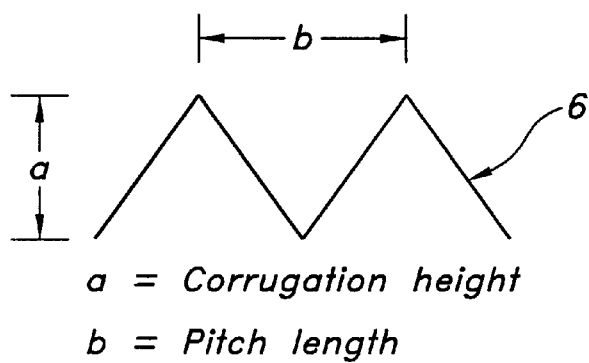
FIG. 6A is a diagram useful for explaining parameters of a corrugated packing material.

Various embodiments of structural packings will now be described. In FIG. 6, packing 2 is diagrammatically representative of a plurality of parallel corrugated sheets of porous mesh material (referred to herein as MEC material) in which the corrugations 4 are represented by diagonal lines which are at an angle α to the vertical direction of flow f. FIG. 6A, a representative cross section of a corrugation 6. Adjacent corrugated sheets 8 alternate 90° from each other.

Figure 7:
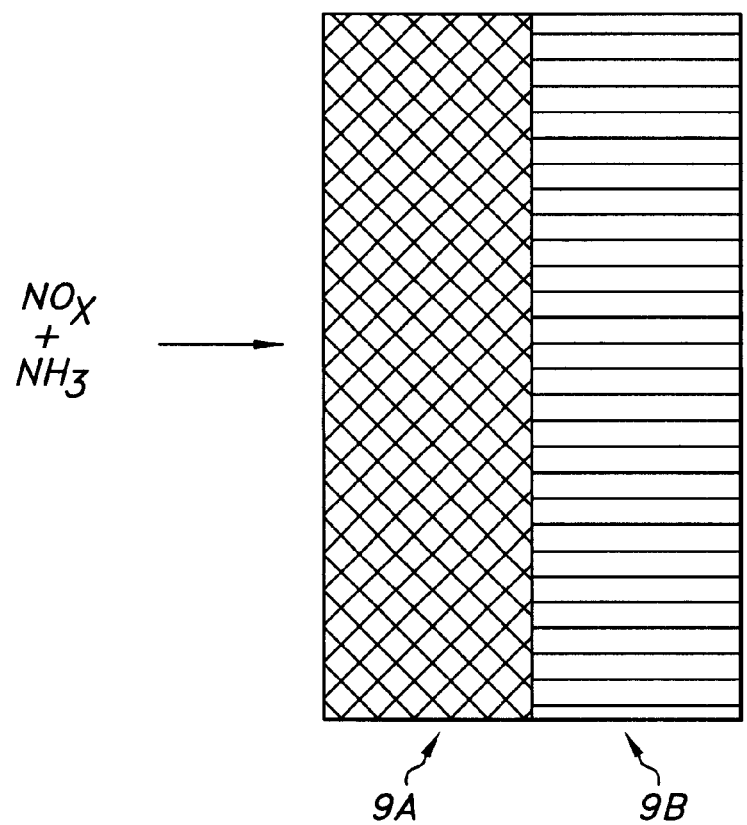
FIG. 7 is a diagrammatic view of a combination of microengineered catalyst and monolith catalyst.

In FIG. 7, a conventional monolith honeycomb structure 9B is combined with MEC mesh material 9A of the present invention for providing a combined catalyst bed structure for the SCR conversion of $NO_x$. The combined structure provides improved conversion. The increase in conversion is believed to be caused by the improved mixing of the structure creating an improved efficiency of the downstream honeycomb monolith.

Figure 8:
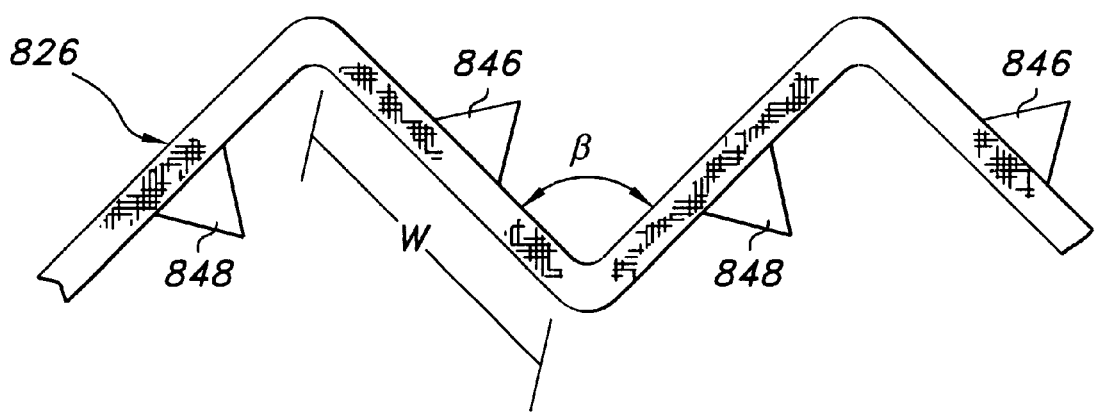
FIG. 8 is an end view of a portion of a packing element.

Referring to FIG. 8, the MEC mesh material can be fabricated from elements 826 of sheet material and can optionally include vortex generators for increasing turbulence of the gas flow therethrough. In FIG. 8, optional vortex generators 846 and 848 are triangular and bent from the plane of the element 826 sheet material. The generators 846 and 848 alternate in the direction in which they project from the plane of the sheet material as best seen in FIG. 8. The corrugations have a width w. By providing additional turbulence, the vortex generators further promote fluid flow through the pores of the MEC material due to the pressure differential thereacross. The side walls of element 826 are inclined at an angle β of about 90°. The roots and crests extend in a linear direction.

The Example below illustrates the operation of the radial flow reactor and deNOx method of this invention.

EXAMPLE

A radial flow gas phase reactor shown in FIG. 2A is employed for the selective catalytic reduction of $NO_x$ in a flue gas stream of two furnaces under the following flue gas conditions:

Flow rate=360,000 lbs/hr

Temperature=360° F. (182° C.)

$NO_x$ content=100 ppm

A sufficient amount of ammonia is added to the flue gas to achieve the desired reduction of $NO_x$. The catalyst employed is MEC coated with $V_2O_5/TiO_2O$ catalyst. A desired NOx reduction of 90% to 10 ppm requires about 54 $m^3$ of the MEC catalyst. This volume is accommodated by a radial flow reactor with an inside bed diameter of 2 meters, an outside bed diameter of 4 meters, and a height of 5.75 meters. No additional volume is required to compensate for velocity maldistribution.

The effective bed length through which the flue gas must pass for treatment is only 1 meter. The resulting pressure loss is only about 0.17 inches $H_2O$ through the catalyst bed, which is increased to 0.3 inches because of changes in flow direction.

In contrast to the radial flow reactor of the Example given above, to achieve the same 90% reduction of $NO_x$, an axial flow reactor using the same catalyst would require a 3×6×3 meter bed with an additional 10%–20% catalyst to accommodate velocity flow maldistribution. The resulting pressure drop for the axial flow reactor is 3 inches $H_2O$, which is 10 times greater than that of the radial flow reactor of the Example.

While the above description contains many specifics, these specifics should not be construed as limitations on the scope of the invention, but merely as exemplifications of preferred embodiments thereof. Those skilled in the art will envision many other possibilities within the scope and spirit of the invention as defined by the claims appended hereto.

What is claimed is:

1. In a combustion system including a furnace containing a combustion zone and a stack positioned above the combustion zone, an improvement comprising a radial flow gas phase reactor for the chemical conversion of nitrogen oxide in a gas stream which comprises:
   a) a shell having interior and exterior surfaces, a gas stream inlet for receiving an inlet gas stream discharged from the combustion zone and having an initial concentration of nitrogen oxide and a gas stream outlet through which treated gas of reduced nitrogen oxide concentration relative to the nitrogen oxide concentration of the inlet gas stream is discharged;
   b) at least one injector for introducing reducing agent into the inlet gas stream;
   c) at least one catalyst bed within the shell positioned therein at a location which is approximately at, or downstream of, the injector, the catalyst bed containing at least one nitrogen oxide conversion catalyst for the selective catalytic reduction of nitrogen oxide in the inlet gas stream to produce a treated gas of reduced nitrogen oxide concentration, the catalyst bed having an interior wall defining an axial first passageway and an outer wall spaced apart from the interior surface of the reactor shell defining a circumferential second passageway; and,
   d) an inlet gas stream deflector for directing the flow of inlet gas containing reducing agent radially through the catalyst bed between the axial first passageway and the circumferential second passageway to produce the treated gas,
   wherein the reactor is positioned in the stack above the combustion zone.

2. The reactor of claim 1 wherein the catalyst bed has an annular configuration, the axial passageway thereof receives the inlet gas stream containing reducing agent, the gas stream deflector is positioned within the axial first passageway and is concentric therewith and has a parabolic outer surface, and the circumferential second passageway communicates with the gas stream outlet.

3. The reactor of claim 1 wherein the circumferential second passageway receives inlet gas stream containing reducing agent, the gas stream deflector is defined by a gas flow barrier at the downstream end of the passageway and the axial first passageway of the catalyst bed communicates with the gas stream outlet of the reactor shell such that the treated gas emerging from the catalyst bed enters the axial first passageway and exits the reactor shell through the gas stream outlet.

4. The reactor of claim 3 wherein the gas flow barrier is defined by the downstream convergence of the outer wall of the catalyst bed and the interior surface of the reactor shell.

5. The reactor of claim 1 wherein the catalyst is in the form of particulate and the configuration of the catalyst bed is defined by a first porous screen defining the outer wall of the catalyst bed and a second porous screen defining the axial passageway of the catalyst bed, said first and second porous screens defining a space therebetween occupied by the particulate.

6. The reactor of claim 1 wherein the catalyst bed is catalyst supported on a mesh structure having a porosity greater than about 85%.

7. The reactor of claim 1 wherein the catalyst bed is a monolith.

8. The reactor of claim 1 wherein the injector is an injector grid positioned upstream of the gas stream inlet of the reactor shell.

9. The reactor of claim 1 further including a fan for increasing the pressure of the inlet gas stream within the reactor shell.

10. The reactor of claim 1 wherein the reactor comprises at least two concentric annular catalyst beds in spaced-apart relationship to each other and further includes at least a second inlet gas stream deflector positioned between the concentric annular catalyst beds.

11. The reactor of claim 6 wherein the mesh structure comprises a randomly oriented plurality of layers of wires or fibers in a three-dimensional network.

12. The reactor of claim 6 wherein the catalyst bed comprises a catalyst supported on a particulate support which is supported on the mesh structure.

13. The reactor of claim 6 wherein the mesh structure comprises shaped structured packing having corrugations or tabs for generating turbulence.

14. The reactor of claim 7 wherein the monolith possesses a plurality of parallel channels.

15. The reactor of claim 14 wherein the parallel channels are hexagonally shaped.

* * * * *